April 2, 1929.  I. E. BROWN ET AL  1,707,900
MOTION DIRECTION SIGNAL FOR MOTOR VEHICLES
Filed April 27, 1927
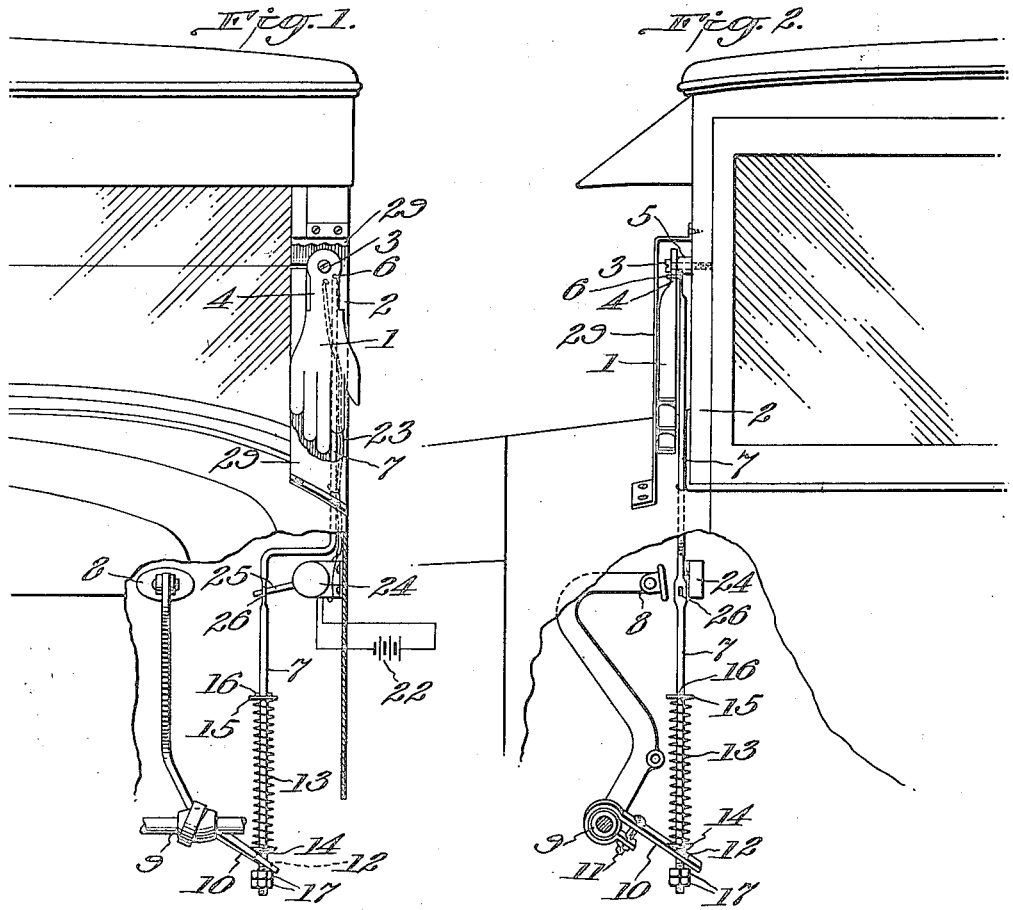
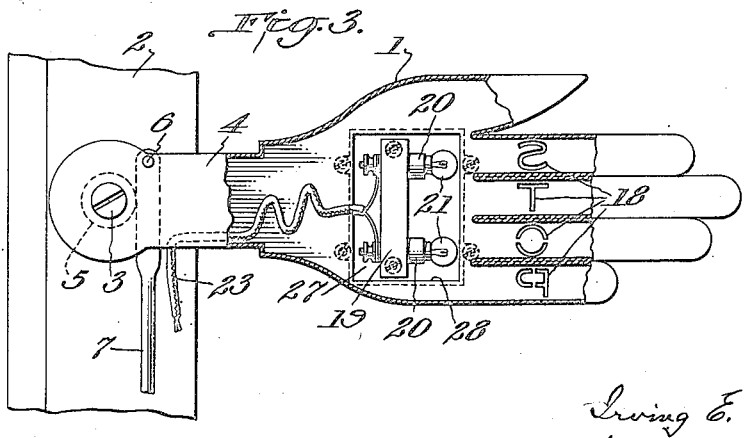
Inventors
Irving E. Brown
Nicholas Hoffman
by W. H. Sincell
Attorney Patented Apr. 2, 1929.

1,707,900

UNITED STATES PATENT OFFICE.

IRVING E. BROWN, OF NEW BRUNSWICK, AND NICHOLAS HOFFMAN, OF PERTH AMBOY, NEW JERSEY.

MOTION-DIRECTION SIGNAL FOR MOTOR VEHICLES.

Application filed April 27, 1927. Serial No. 186,942.

This invention relates to devices for use with vehicles, particlarly motor-vehicles, for indicating to the drivers of vehicles following that upon which the device of the invention is used that a stop or turn is to be made, in order that they may control their vehicles accordingly.

The object of the invention is to provide a device of this character which is operated automatically in response to operation by the driver of the vehicle of control mechanism commonly used when a turn or stop is to be made, such as the brake pedal of an automobile.

The invention consists in a device in the nature of a semaphore arm, shaped preferably in simulation of a hand, and so mounted upon the vehicle as to be easily seen from the rear when in operative or signalling position, and in means for so connecting this device to the brake pedal of the vehicle as to move it to operative or signalling position upon application of the vehicle brakes, as we will proceed now to explain and finally claim.

In the accompanying drawings illustrating the invention, in the several figures of which like parts are similarly designated, Figure 1 is a fragmentary sectional front elevation of an automobile with the device of our invention applied thereto. Fig. 2 is a side view of the parts shown in Fig. 1. Fig. 3 is an enlarged sectional elevation of the handlike semaphore arm.

The hand-like member or semaphore arm 1 is pivotally mounted, preferably upon one of the front top-stanchions 2 of the automobile body, by means of a cap-screw 3 which passes through an extension 4 of the arm 1 and through a sleeve 5, and is suitably secured to or in the stanchion 2.

Connected to the arm 1 by means of a pin 6 is a rod 7 which extends downwardly into proximity to the brake pedal 8 of the vehicle. To this brake pedal at its pivot bearing 9 is attached a lever 10 clamped to the bearing 9 by a bolt 11, as illustrated in Fig. 2.

The rod 7 passes loosely through a hole 12 in the end of this lever 10 and operative connection between the lever and rod is made through a resilient member or spring 13 having bearings between a loose washer 14 riding on the lever and a washer 15 fixedly located relatively to the rod by means of a pin or the like 16. Lock nuts 17 are applied to the end of the rod to prevent it from pulling away from the lever 10.

The hand-like arm 1 is of hollow formation, as shown in Fig. 3, and is provided with the perforated letters 18 forming the word "Stop". Within the arm we provide an insulator block 19 carrying the lamp sockets 20 in which are mounted the electric lamps 21, and suitable electrical connection between these lamps and a battery 22, such as the automobile battery, is made through suitable wiring 23 by a switch 24 operated by the rod 7 by means of a lever 25 loosely connected with the rod as shown at 26, or in any other appropriate manner.

In order that the lamps 21 may be replaced and the wiring within the arm 1 inspected we may mount the insulator block 19 upon a plate 27 which forms a closure for an opening 28 through which the block 19 with the sockets 20 and lamps 21 may be removed from and replaced within the interior of the arm 1.

The hand-like semaphore arm 1 may be colored red so as to make it of high visibility in daylight, and the lamps 21 will preferably be clear glass so that the word "Stop" will appear brightly illuminated in the dark.

A shield or cover 29 is suitably arranged and secured in front of the arm 1, so that the arm will be concealed when in inoperative position, as shown in Figs. 1 and 2.

The operation of the device is as follows: When the brake pedal 8 is depressed, the lever 10 will act upon the spring 13 to move the rod 7 upward. This will cause the arm 1 to turn upon its pivot until it reaches a horizontal position, as shown in Fig. 3, and its extent of movement is limited at this point by the side of rod 7 striking against the sleeve 5.

Any further depression of the pedal 8 and consequent movement of lever 10 will be taken up by the lost-motion connection furnished by the spring 13 and will have no further operative effect upon the rod 7 and arm 1.

When the rod 7 moves upward under the action of lever 10, the switch lever 25 will be actuated to close a circuit through the lamps 21 so that as soon as the arm 1 is projected the lamps are lighted and the signal "Stop" appears in illuminated letters.

When the brake pedal 8 is released, the arm 1 returns by gravity to inoperative, concealed position behind the cover or shield 29, as shown in Figs. 1 and 2, and the rod 7 being moved downward operates the switch lever 25 to open the circuit through the lamps 21.

It will thus be seen that we provide a very simple and effective signal, which has few parts, is easily assembled upon any vehicle body which provides a suitable support such as the stanchion 2, has no delicate mechanism which would be injured by vibration or rough usage, and is not cumbersome or unsightly.

Moreover, the device being mounted in a position where it is visible to the driver of the vehicle carrying it, it gives him, at all times, a check upon the operation of his "stop light" or signal.

Obviously, the arm 1 need not be painted red, although we prefer this color, but may be painted with any color of high visibility, and the shield or cover 29 may be colored to match the color of the automobile.

Various changes are contemplated as within the spirit of the invention and the scope of the following claims.

What we claim is:—

1. In a signal for vehicles, a semaphore arm mounted for movement into and out of signalling position, means including a rod connected with said arm and a lever connected with a control member of the vehicle for moving said arm into signalling position, means for limiting movement of said arm in such position, and a lost motion connection interposed between said rod and lever including a spring surrounding said rod, said spring having one of its ends fixed relatively to said rod and its other end in engagement with said lever and slidable on said rod, whereby excess movement of the lever will compress said spring and will not be transmitted to said arm.

2. In a signal for vehicles, a semaphore arm mounted for movement into and out of signalling position, a pivot member for said arm, means including a rod carried by said arm and a lever carried by and operated simultaneously with the operation of the brake pedal of said vehicle for moving said arm into signalling position, such movement being limited by engagement of said rod with said pivot member, and a lost motion connection interposed between said rod and lever and including a resilient compression member carried by said rod and having one of its ends fixed relatively thereto and its other end engaged by said lever, whereby when said rod engages said pivot member excess movement of said lever under the influence of said pedal will compress said resilient member and thus be absorbed in said lost motion connection and will not affect said arm.

3. In a signal for vehicles, a semaphore arm pivoted for movement into and out of signalling position, means including a rod carried by said arm and a lever connected to and operable simultaneously with the operation of the brake pedal of the vehicle to move said arm to signally position, and means forming a part of the pivot of said arm and cooperating with said rod for limiting movement of said arm in signalling position.

4. In a signal for vehicles, a support, a semaphore arm, a pivot member therefor, a sleeve on said pivot member serving to space said arm from said support, and means including a rod and lever for moving said arm upon its pivot, the pivotal movement of said arm in one direction being limited by engagement of said rod with said sleeve.

5. In a signal for vehicles, a semaphore arm mounted for movement into and out of signalling position, means for imparting movement to said arm including a rod pivoted to said arm and a lever, said lever provided at one end with means for attaching it to the brake pedal of said vehicle for pivotal movement with said pedal and its other end formed to receive said rod in sliding association, and a helical compression spring encircling said rod and having one of its ends fixed relatively thereto and its other end slidable thereon and in engagement with said lever, whereby limited braking movement of said pedal will cause said spring to move said rod and elevate said arm to signalling position and excess braking movement of said pedal will compress said spring.

In testimony whereof we have hereunto set our hands this 20th day of April, A. D. 1927.

IRVING E. BROWN.
NICHOLAS HOFFMAN.